United States Patent [19]
Lyall et al.

[11] Patent Number: 5,689,938
[45] Date of Patent: *Nov. 25, 1997

[54] METHOD OF FABRICATING AND INSTALLING GAS SERVICE LINE COMPLETION KIT

[75] Inventors: Robert W. Lyall, Huntington Beach; Jeffrey W. Lyall, Orange; Mark E. Huetinck, Brea, all of Calif.

[73] Assignee: R. W. Lyall & Company, Inc., Corona, Calif.

[ * ] Notice: The term of this patent shall not extend beyond the expiration date of Pat. No. 5,501,331.

[21] Appl. No.: 520,095

[22] Filed: Aug. 28, 1995

Related U.S. Application Data

[63] Continuation-in-part of Ser. No. 325,135, Oct. 20, 1994, Pat. No. 5,501,331.

[51] Int. Cl.$^6$ .......................... B65B 35/30; B65D 85/00; F16L 41/08

[52] U.S. Cl. .................. 53/445; 53/443; 53/430; 53/449; 206/223; 137/15; 137/315

[58] Field of Search ................ 137/15, 315, 316; 206/223, 582; 53/443, 445, 410, 430, 449

[56] References Cited

U.S. PATENT DOCUMENTS

| | | | |
|---|---|---|---|
| 1,309,273 | 7/1919 | Cave . | |
| 2,652,922 | 9/1953 | Schweich . | |
| 2,832,466 | 4/1958 | Sheard . | |
| 3,127,986 | 4/1964 | Hulka | 206/223 |
| 3,245,257 | 4/1966 | Anderson | 137/315 |
| 3,417,867 | 12/1968 | Kahn . | |
| 3,946,754 | 3/1976 | Cook | 137/315 |
| 4,427,112 | 1/1984 | Di Giovanni et al. . | |
| 4,869,371 | 9/1989 | Dickinson et al. | 206/223 |
| 5,501,331 | 3/1996 | Lyall et al. | 53/443 X |

OTHER PUBLICATIONS

Exhibit A—Schuler Manufacturing Company Promotional Letter.
Exhibit B—So. Carolina Electric & Gas Co. drawing No. A–34380 and parts list for 250 meter on 7" W.C. pressure.
Exhibit C—Drawings, pp. 1–8, believed prior to Oct. 20, 1993.
Exhibit D—R.W. Lyall Invoice No. 25135 for DELMV060010B and Delmarva Purchase Order No. 530280.
Exhibit E—Baltimore Gas and Electric specification, GS318–1, p. 1, subject: Riser for ⅝" O.D. plastic tubing and R.W. Lyall drawing on Lyco Anodeless Meter Rise and specifications.

(List continued on next page.)

*Primary Examiner*—Linda Johnson
*Attorney, Agent, or Firm*—Fulwider Patton Lee & Utecht, LLP

[57] ABSTRACT

Selecting a dimension representing the distance between a residential gas hookup, downwardly through an intended subterranean trench to a gas main typically located along a public right of way, such as a street, and selecting a plastic pipe having a predetermined length at least equal to such dimension. Then, fabricating at a manufacturing site remote from the intended site of installation, a kit including a metallic riser having an upper end formed with a coupling screw thread and a lower end. Inserting one extremity of the plastic pipe through the riser to leave an excess length projecting from such lower end, forming a joint between the plastic pipe and such upper end, coiling such excess length into a coil and securing the assembly in a package to form the kit. A selected number of the kits may then be stored in their packaged form for subsequent shipment to the installation site to be installed and connected to make a hookup between the hookup location at respective residences and such main gas line.

23 Claims, 9 Drawing Sheets

OTHER PUBLICATIONS

Exhibt F—R.W. Lyall Sales Order No. 12694 to KTI, Limited regarding 60" pigtail and KTI Limited's Purchase Order No. 2736 and specification Form Revision A, dated Apr. 23, 1991.

Exhibit G—R.W. Sales Order 19368 to Rockford–Eclipse re Meter Bar Assembly; Eclipse, Inc. Purchase Order 64108 for Meter Bar Assembly; Washington Gas & Light Drawing No. C–53–SD–39.

Exhibit H—Michigan Gas Co. Purchase Order No. 58179–2 for Meter Assembly; Sales Order R.W. Lyall dated Jul. 2, 1992 for Meter Riser Assembly; R.w. Lyall Drawing No. BRKT–SEMIG1 (2 pages).

Exhibit I—R.W. Lyall Work Order to So. California Gas dated Jul. 27, 1984 for riser with valve; So. California Gas P.O. No. 4–87838 for riser; R.W. Lyall drawing dated Feb. 1, 1983.

Exhibit J—R.W. Lyall Work Order to Southwest Gas Jul. 23, 1984; Southwest Gas Purchase Order dated Jul. 18, 1984; R.W. Lyall drawing dated Mar. 28, 1984.

Exhibit K—Two page fax transmission from Pacific Pipeline Products to R.W. Lyall dated Aug. 13, 1993.

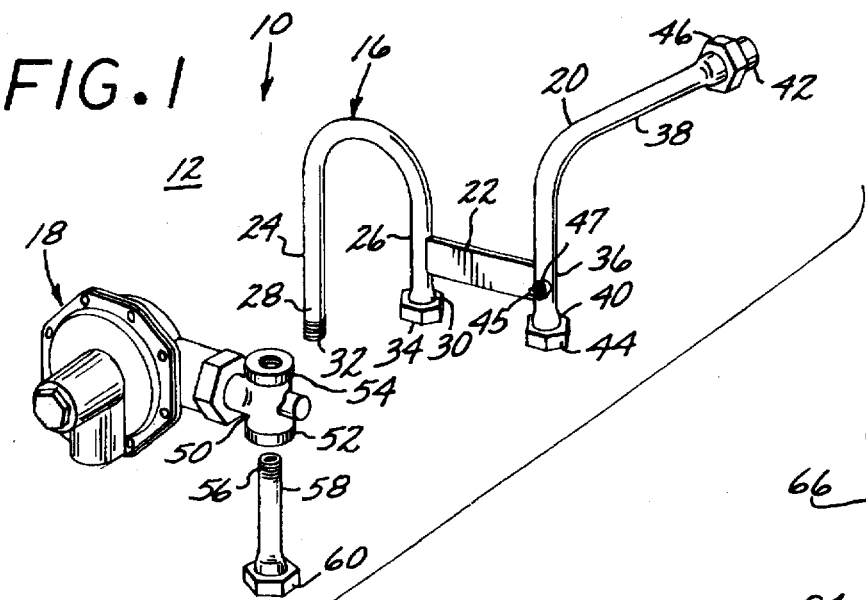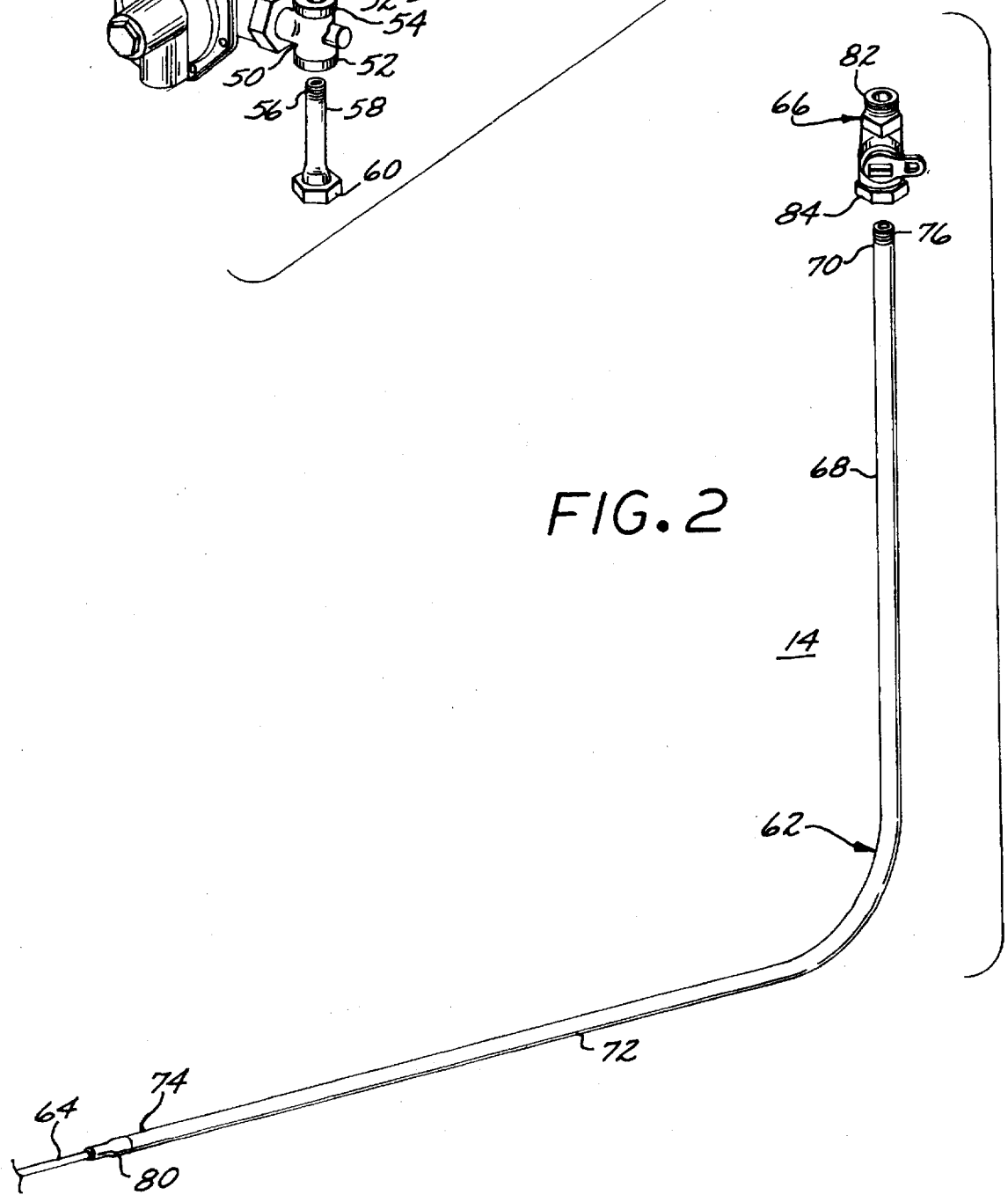

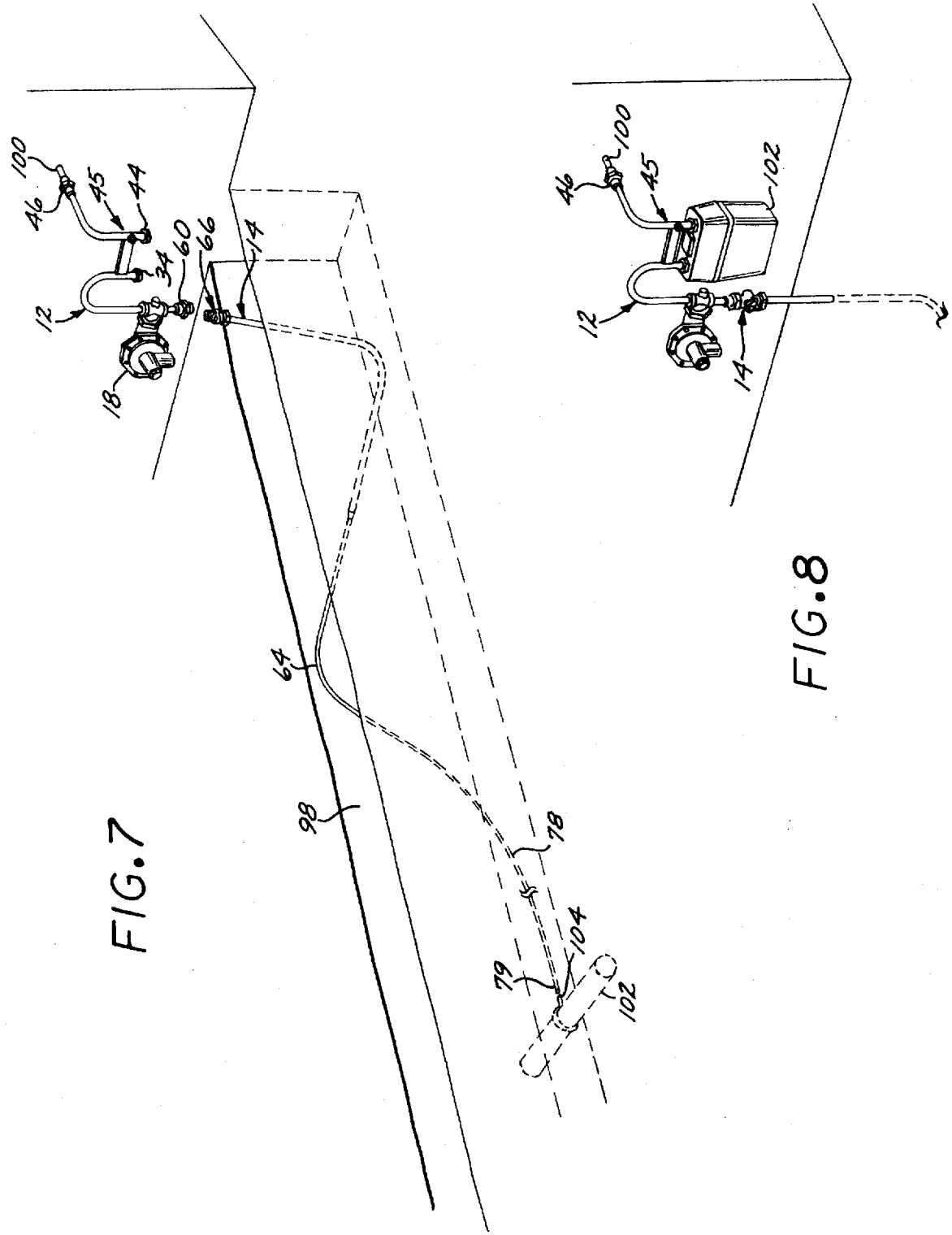

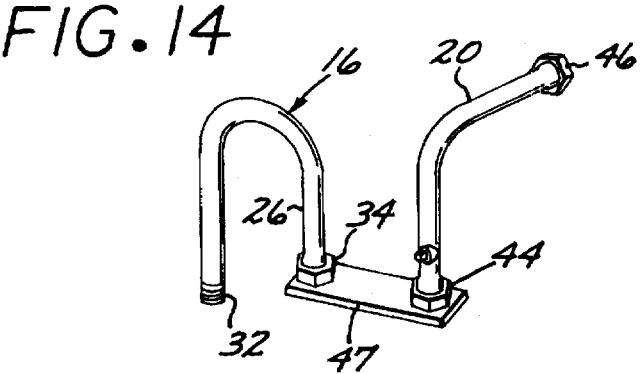
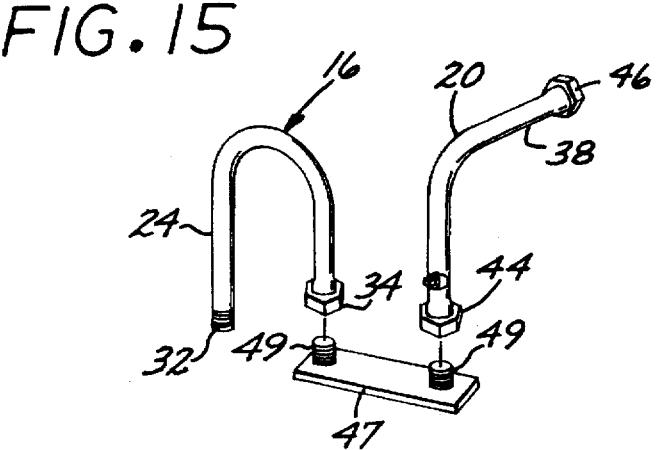
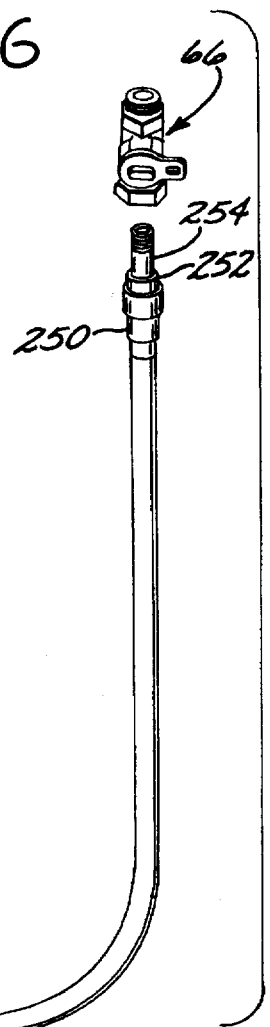

METHOD OF FABRICATING AND INSTALLING GAS SERVICE LINE COMPLETION KIT

This application is a continuation-in-part application of Ser. No. 08/325,135, filed Oct. 20, 1994, now U.S. Pat. No. 5,501,331.

BACKGROUND OF THE INVENTION

1. Field of the Invention

The present invention is related to piping systems for installing gas service from a gas distribution main pipeline to a residential or commercial gas inlet connection, and more particularly to a gas service completion kit for conveniently and rapidly installing such gas service.

2. Description of the Prior Art

It is well known that natural gas is a clean and relatively inexpensive fuel source. As such, gas distribution systems have been widely installed in various population centers throughout the United States and many other countries of the world. To supply and provide gas service to end users, such as commercial and residential consumers, service pipelines are typically branched from main gas distribution pipelines laid along a utility route, for instance, under a roadway. These service pipelines typically incorporate an above ground shut-off valve, a pressure regulator for stepping down gas pressure to a gas meter, and therefrom the meter is plumbed to a gas inlet connection pipe typically stubbed outwardly from a side wall of the dwelling or facility.

Safety regulations require that any exposed service pipe be metallic in nature to provide sufficient rigidity and structural integrity for supporting the pressure regulator and gas meter while providing protection against damage and possibility of rupture should such pipe be accidentally contacted by sharp or hard objects. Buried underground gas transmission service pipes, however may be composed of plastic materials, such as polyethylene plastic tubing, since such underground plastic tubing runs a lesser risk of accidental contact from a hard object. Plastic tubing is desirable because it is relatively inexpensive to manufacture, resistant to corrosion and requires less labor for installation.

Therefore, the industry has adopted the use of metallic L-shaped gas meter riser pipes incorporating transition couplings to transition from underground plastic tubing to the above ground metallic pipe. Typically, the riser pipe is telescoped over a length of plastic tubing so that one end of the plastic tubing is disposed within the upper end of the riser pipe. Thereafter, the end of the plastic tubing may be plasticly deformed using any one of various styles of compressive fittings to form a fluid tight joint between the riser pipe and the plastic tubing. The opposite end of the plastic pipe typically projects a short distance from the opposite end of such riser, for instance twelve inches, to provide what is often termed a pigtail for connection to an intermediate length of plastic pipe which will lead to the subterranean distribution main pipe. Such riser pipes are typically prefabricated at a factory site for subsequent installation by service line installers. While there have been some instances in the past when prior art risers have, for special applications, been formed with long plastic pipe pigtails, more typically the riser assemblies fabricated in a factory setting have been constructed with relatively short pigtails, on the order of 10–12 inches in length.

Installation of such service distribution system pipelines typically involves a route where a series of such service lines are to be installed, for instance at a new housing tract. As such, an installation crew, of perhaps three or more members, attends to installation along the route. Typically, the installers use various conventional pipe fittings such as threaded elbows, nipples and unions coated with sealant and screwed together with the riser pipe, pressure regulator, shut-off valve, and gas meter at the job site. In recognition of the inefficiency of this practice, some installers have taken advantage of slower work periods to preassemble some of the pipe fitting components to have an inventory ready for transport to the job site when the actual installation is to take place. For the accepted method of installation, however, a heavily ladened, heavy-duty truck carrying lengths of threaded pipe, pipe cutters, sealants pipe threaders, electric generators, plastic pipe fusion butt welders, and pipe wrenches, as well as other tools, must accompany the crew to the site. The expense of inventorying all the required component parts and the time required for each of the work crews to collect the required number of mating components for the days job is considerable. The delay in requisitioning the numerous individual parts from a central inventory has been so great that some crews seek to load their trucks with a couple of weeks supply to thus prolong the time period during which they will not be faced with the inevitable delay at requisition. This, of course, compounds the expense of inventorying parts and attributes greatly to the likelihood that errors will occur both at central inventory and in loading the individual crew truck with the correct number of individual mating parts which will be required for the numerous individual job sites that will be serviced over a one or two week period. Also, as is well known to those skilled in the art, the accompanying truck and tools are very costly.

Then once the crew has arrived to the installation site, a factory assembled riser pipe and various lengths of threaded short nipples, elbows, union fittings, and the like, including a shut-off valve, pressure regulator, and a gas meter are selected for a assembling the service connection. The threads are taped or otherwise coated with a sealant. Typically, the upper end of a factory fabricated riser pipe is threaded to a shut-off valve and a series of short threaded nipples and coupling unions are screwed together to connect the valve to a gas regulator. Thereafter, a series of alternating nipples and elbow fittings are screwed together to form a turn-back U assembly. The end of the turn-back U assembly is coupled to a threaded union fitting for attachment to a gas meter. From the outlet fitting of the gas meter, another union fitting and a series of nipples and an elbow fittings are threadedly joined and therefrom another union fitting is connected to a stubbed inlet connection at the residence. The free end of the pigtail of plastic tubing extending from the bottom of the riser pipe is heated by a heater to fusion weld it to an intermediate length of plastic tubing, the opposite end thereof connected to a tee fitting at the gas distribution main. Thereafter, the above ground portion of the completed service line assembly is coated with paint or a rust inhibitor. It is to be appreciated that the assembly time required to perform such assembly operation, even before pressure check, may be on the order of about thirty minutes.

Once the service line assembly is completed, regulations require that such assembly be pressurized to a predetermined pressure and leak tested prior to such service line assembly being brought into service. Such leak testing operations typically take on the order of another thirty to forty minutes. Corrective action must be taken for any leaks detected. It is to be appreciated that the complete installation time for a single service line may take on the order of an hour, involving two to three man-hours, an exercise which can prove to be very costly at today's labor rates.

In addition, it has been found that the effectiveness of the rust inhibitor or paint coating deteriorates over time causing various ones of the threaded connections to leak which may result in possible dangerous conditions and increased gas usage. The greater the number of threaded connections the greater the risk of leakage.

Hence, those skilled in the art have recognized the need for gas service completion kit to facilitate convenient and efficient field installation of gas service to end users while minimizing parts and installation labor costs. The kit should incorporate a minimum number of components to lower manufacturing costs while facilitating ease of factory assembly and adding to the accuracy of inventorying the correct number of component parts. Such a kit should reduce the need for heavy-duty field installation tools and should eliminate the need to assemble an extensive number of pipe fittings in the field. Furthermore, such a kit should offer a construction that reduces the possibility of corrosion and rust over the life of the system. In addition, such a gas service completion kit should be provided in a compact package for convenient handling, storage, shipment and transport to the field. The present invention meets these needs and others.

SUMMARY OF THE INVENTION

The invention is in the form of a factory fabricated gas service field installation kit for providing a cost effective, rapidly installed service connection from a gas distribution main to a gas meter having meter inlet and outlets spaced a predetermined distance from the main.

Briefly and in general terms, the kit is constructed of components including a gas meter mounting assembly and a riser assembly having an integral plastic pipe of a sufficient length to reach from the gas meter to the gas main.

In particular, the gas meter mounting assembly includes first and second metallic pipes of respective predetermined lengths. The first pipe is bent to form a turn-back U having first inlet and outlet ends. The second metallic pipe is bent to form an elbow having second inlet and outlet ends. If desired, a bracket may be affixed between the turn-back U and the elbow so that the first outlet end of the turn-back U and the second inlet end of the elbow are spaced apart a predetermined distance and held at a predetermined orientation relative to one another for connection to the meter inlet and outlets. The outer surfaces of the bracket, the turn-back U, and the elbow are then coated with a protective polymeric coating. A pressure regulator is thereafter coupled to the inlet end of the turn-back U.

The integral riser assembly includes an L-shaped riser pipe coupled to an integral length of plastic riser tubing. The tubing is of a length sufficient to extend through the riser pipe and sufficiently far beyond the bottom end thereof to, when installed, reach the gas distribution main. The bottom end of the riser pipe is telescoped over a free end of the plastic tubing so that the excess length of the plastic tubing projects from the bottom end. The upper end of the plastic riser tubing is thereafter coupled to the upper end of the riser pipe to form a fluid tight gas impermeable joint therebetween. A shut-off valve is provided having valve inlet and outlet fittings, the outlet fitting thereof being coupled to the upper end of the riser pipe.

The riser assembly and the mounting assembly are packaged for convenient handling. They may be packaged on a mounting board by coiling the excess length of the plastic tubing of the riser pipe assembly to form a coil, and affixing the riser assembly including the coil and the mounting assembly including the pressure regulator to the mounting board.

In one aspect of the invention, a set of gas service completion kits of the type described above, are packaged together to provide a convenient set for installation to service adjacent dwelling houses, as would be the case in a housing tract. In this aspect of the invention, a pair of mounting assemblies and riser assemblies are affixed to a mounting board to form the package. In addition, one of the lengths of plastic tubing of one of the riser assemblies may be longer than the other length of plastic tubing of the second riser pipe. The longer length of plastic tubing may have a coupling tee disposed along an intermediate location thereof for coupling to the free end of plastic tubing of the second riser pipe when installed in the field.

Other features and advantages of the invention will become apparent from the following detailed description taken in conjunction with the accompanying drawings, which illustrate by way of example, the features of the invention.

BRIEF DESCRIPTION OF THE DRAWINGS

FIG. 1 is an exploded perspective view of a gas meter mounting assembly included in the gas service field completion kit apparatus of the present invention;

FIG. 2 is an exploded perspective view of a riser assembly of the gas service field completion kit embodying features of the present invention;

FIG. 7 is a perspective view, in reduced scale, of the gas service field completion kit shown in FIGS. 1 and 2 during installation.

FIG. 8 is a partial perspective view of the gas service field completion kit shown in FIG. 7 as fully assembled with a gas meter;

FIG. 14 is a perspective view of a modification of the gas meter mounting assembly included in the kit apparatus shown in FIG. 1;

FIG. 15 is a perspective view similar to FIG. 13 but showing the mounting assembly exploded;

FIG. 16 is a perspective view similar to FIG. 2 and depicting a modification of the riser included in the kit apparatus of the present invention.

DETAILED DESCRIPTION OF THE PREFERRED EMBODIMENT

Referring to FIGS. 7 and 8, the invention is embodied in a factory fabricated gas service field completion kit apparatus 10 for completing a gas service connection through a gas meter 102 having a meter inlet and outlet 99 & 101, respectively, arranged in a predetermined orientation to thereby complete a connection from a gas distribution main line 102 and a residential or commercial gas inlet pipe fitting 100 (FIG. 7).

Typical prior art methods used to complete a service line connection between a gas distribution main and a gas service inlet fitting at an end user involve the field assembly of a multitude of components. Furthermore, in practice, a series of such service line connections are to be installed, for instance at a new housing tract having a plurality of adjacent homes along a street, whereby the number of components necessary to complete such installations are multiplied. Commonly, an installation crew, of perhaps three or more members, attends to the installation of the series of service connections. Typically, the installers use various conventional pipe fittings to effectuate the installation of a riser pipe, pressure regulator, shut-off valve, and gas meter at each installation site. Therefore, a heavily ladened, heavy-duty truck carrying lengths of pipe, pipe cutters, pipe threaders, electric generators, plastic pipe fusion butt welders, and pipe wrenches, as well as other tools, accompany such crew to the site.

Figure 10:
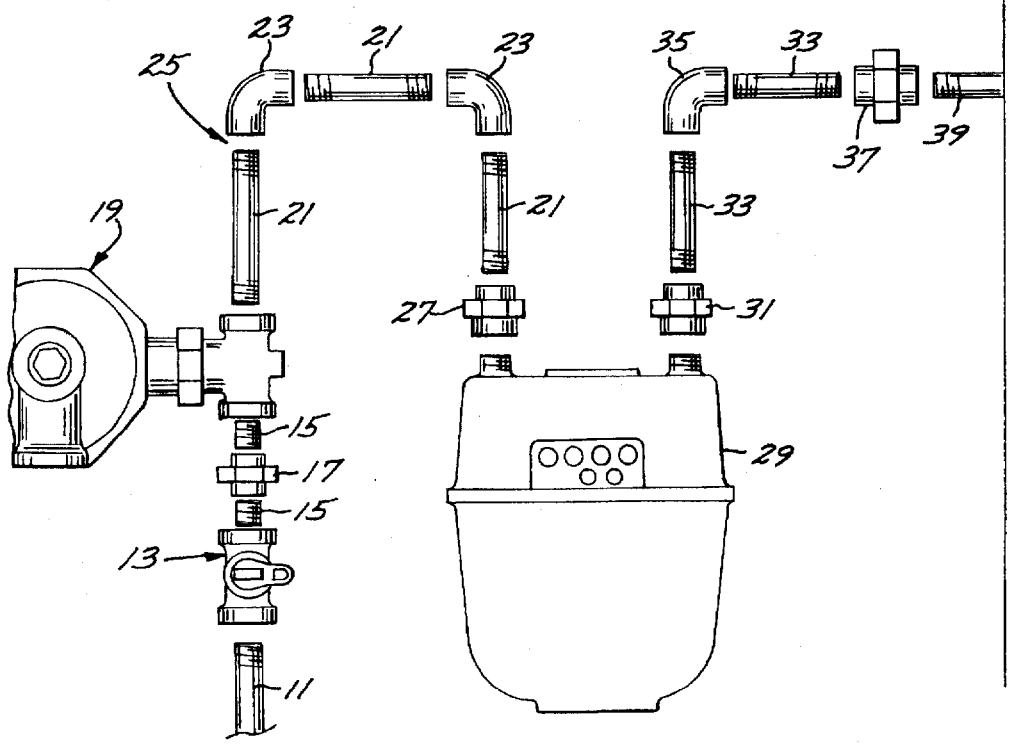
FIG. 10 is an exploded side view of a prior art mounting assembly, a partial riser pipe, and gas meter.

Referring to FIG. 10, the prior art method of assembling and installing a single service line connection involves coupling the upper end of a threaded riser pipe 11 to a shut-off valve 13. Thereafter, a pair of short threaded nipples 15 and a union 17 are threaded from the valve to a regulator 19. A series of alternating nipples 21 and elbow fittings 23 are then threadedly joined to form a turned back U assembly 25. The end of the turned back U assembly is threaded to a threaded union fitting 27 for attachment to a gas meter 29. From the outlet fitting of the gas meter, another union fitting 31, a series of nipples 33 and an elbow fitting 35 are threadedly joined using another union fitting 37 to connect to a stubbed inlet connection 39 at the residence. During the assembly of such piping configuration, each threaded connection is coated with a Teflon® pipe sealant or pipe dope prior to threading. The free end of a pigtail of the plastic tubing (not shown) extends from the bottom of the riser pipe and is fusion butt welded to an intermediate length of plastic tubing, the opposite end thereof connected to a tee fitting at the gas distribution main. Thereafter, the above ground portion of the completed service line mounting assembly is coated with paint or a rust inhibitor. Typically, the assembly time required to perform such assembly operation may be on the order of about thirty minutes.

Once the service line connection is assembled in the manner described above, regulations require that such assembly be pressurized to a predetermined pressure and leak tested prior to such service line assembly being brought into service. Such leak testing operations may take on the order of about thirty to forty minutes. Therefore, it is to be appreciated that the complete installation time for a single service line may take on the order of an hour, involving two to three man-hours. Moreover, it has been found that the effectiveness of the rust inhibitor or paint coating deteriorates over time causing threaded connections to leak which may result in possible dangerous conditions and increased gas usage.

Taken with the foregoing in mind, the gas service field completion kit 10 of the invention provides a more corrosion resistant, straight forward, prepackaged, reliable gas meter field completion kit for convenient handling, storage, shipment and transport to the field. The kit incorporates a minimum number of components so that manufacturing costs are held to a minimum while facilitating ease of factory assembly. Furthermore, the gas service completion kit facilitates convenient and rapid field installation which, in turn, minimizes field installation labor costs.

Figure 9:
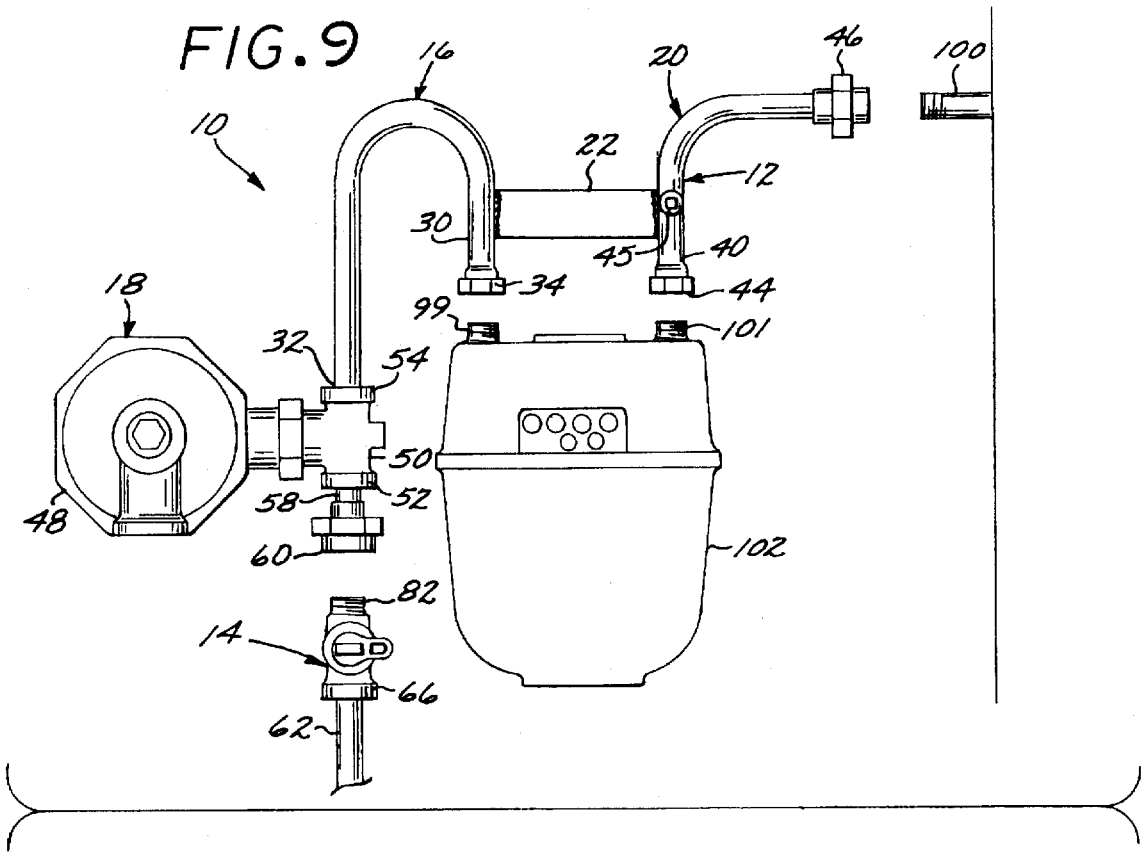
FIG. 9 is an enlarged exploded front view of the gas meter mounting assembly, a partially sectioned side view of the riser assembly and gas meter.

Referring to the drawings and in accordance with the invention, the gas service field installation kit 10 includes, in general, a gas meter mounting assembly 12 configured for rapid coupling to a riser assembly 14. As shown in FIG. 1, briefly and in general terms, the gas meter mounting assembly 12 is of metal construction and includes a formed turned back U-fitting 16 for mounting a pressure regulator 18, a formed elbow 20 and a strap defining a spacer bracket 22 secured between such elbow and U-fitting. The U-fitting 16 is formed from a length of metallic pipe and bent using an appropriate pipe bender to form a radius U-shaped configuration to define parallel long and short legs, 24 and 26 respectively, providing an inlet end 28 and outlet end 30 spaced apart and oriented to, in final assembly, locate the pressure regulator 18 relative to the meter 102 (FIG. 9). The inlet end 28 is formed with external threads 32 and the outlet end 30 is formed by a female threaded union fitting 34.

The elbow 20 is formed from a length of metallic pipe and bent using an appropriate pipe bender to form a radius L-shaped configuration having a vertical leg 36 and a horizontal leg 38 having inlet and outlet couplings 44 and 46, respectively, mounted thereon in spaced relation to, when installed, locate the meter 102 relative to the gas inlet pipe fitting 100 (FIG. 9).

The bracket 22 is in the form of an elongated rectangular plate. The opposite free ends of the bracket may be affixed, for instance by weldment, in a perpendicular relationship to the vertical leg 36 of the elbow 20 and to the short leg 26 of the turned back U 16 such that the respective short leg 26 and the vertical leg 36 of the elbow are in spaced apart parallel alignment. In addition, the bracket is mounted such that the horizontal leg 38 of the elbow projects rearwardly from the bracket in an orthogonal relationship relative to the parallel legs 24 and 26 of the turned back U. Furthermore, in the present embodiment, the union 44 at the second inlet end 40 of the elbow 20 is spaced a predetermined distance from the outlet end union 34 of the turned back U 16 such that the respective unions are directed in a parallel relationship to define a predetermined orientation. Such predetermined orientation and spaced relation of the respective unions 34 and 44 are selected to conform to conventional predetermined spaced apart and oriented gas meter inlet and outlet fittings 99 and 101 for subsequent mating thereto (FIG. 9). In practice, this procedure is undertaken on an assembly line basis employing jigs and fixtures fabricated in a conventional manner to facilitate shaping and orientation of the components during assembly to provide the desired spaced relationship for the particular model of gas meter 102 to be installed.

In some embodiments of the present invention, the bracket 22 is replaced by a plastic yoke which temporarily clips at its opposite ends over the elbow 20 and turned back U 16 to hold them together for shipping. In another embodiments (FIGS. 14 and 15) a rectangular flat packaging plate 47 is surmounted by a pair of nipples 49 onto which the unions adjacent 34 and 44 temporarily screw for shipping purposes.

The vertical leg 36 of the elbow 20 of the gas meter mounting assembly 12 may incorporate an in-line by-pass valve apparatus 45. The by-pass valve allows the gas meter 102 (FIG. 8), when operatively installed on the mounting assembly, to be serviced or replaced while the end user continues to receive a supply of gas. An auxiliary port having a plug 47 threadedly received therein is machined through the side wall of the vertical leg for allowing access from an auxiliary gas source. The by-pass valve includes an open-ended cylindrical poppet cage having outlet flow ports machined around the periphery thereof concentrically received within the interior of the vertical leg of the elbow. The poppet cage is oriented so that the open end of the poppet cage faces downwardly in an opposing direction to the gas flow wherein the opposite end of the poppet cage is operatively connected to the auxiliary port. A poppet is floatably carried in the poppet cage having free axial movement therein. During normal operation, gas flow drives the poppet away from the outlet ports to allow free flow therethrough. When the gas meter requires service, an auxiliary gas source is coupled to the auxiliary port and activated to drive the poppet downwardly past the outlet flow ports to block normal gas flow while such auxiliary gas flows through the outlet ports of the poppet cage and to the end user. As such, the gas meter may be serviced and gas service to the end user is uninterrupted. A by-pass valve apparatus of this type is disclosed in application, assigned to the assignee of the present invention and entitled Apparatus for Changing Out Gas Meters, Ser. No. 08/337,768 filed on Nov. 14, 1994, now U.S. Pat. No. 5,437,300.

Figure 3:
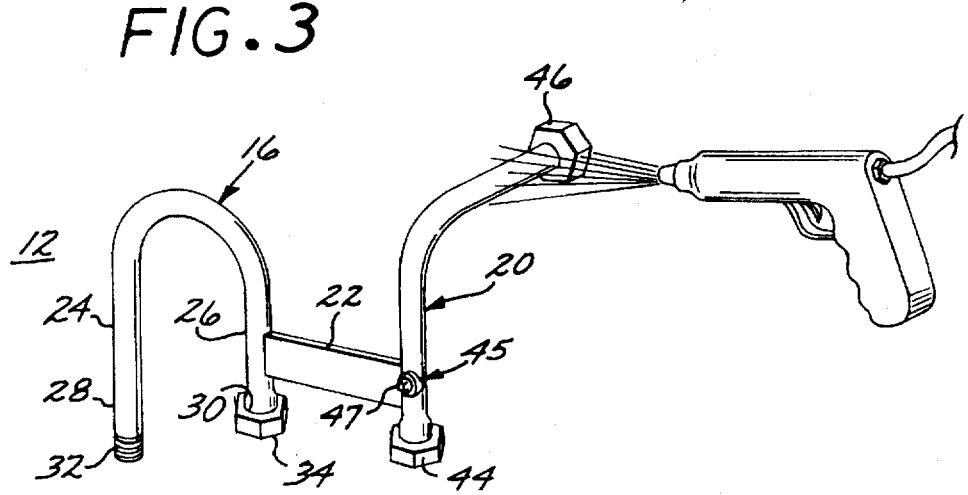
FIG. 3 is a perspective view of the mounting assembly shown in FIG. 1, illustrating a step of coating the mounting assembly with a protective coating.

Once fabricated in the manner described above, the gas meter mounting assembly 12 is coated with a protective coating, such as polyester. As shown in FIG. 3, a fine, electrostatically charged polyester coating is applied to the external surfaces of the mounting assembly for instance by compressed air spraying. The coating is then baked and cured using methods known well to those skilled in the art providing a smooth, corrosion resistant surface.

For special applications, as for instance, for marine or salt water environments, a metalizing spray such as aluminumizing, may be applied by a flame gun to inhibit corrosion.

The conventional pressure regulator 18 is selected of the type having a pressure reducing housing 48 and a tee fitting 50 in fluid communication therewith, the bottom leg of the tee fitting having a female threaded regulator inlet fitting 52 and the top leg of the tee fitting having a female threaded regulator outlet fitting 54. The pressure regulator operates to step down the gas delivery pressure, typically between thirty and sixty psi., to approximately a one psi. operating service pressure. The regulator outlet fitting 54 of the tee is then threadedly engaged to the threaded fitting 32 at the first inlet end 28 of the turned back U 16. An externally threaded top end 56 of a short nipple 58, having a female union fitting 60 secured to the bottom end thereof is threadedly engaged to the regulator inlet fitting 52 to complete the mounting assembly. It is to be appreciated that the short nipple may likewise be electrostatically coated with protective polyester, in the same manner described above.

The components of the mounting assembly 12 are composed of a metallic alloy, such as steel, to provide sufficient rigidity and structural integrity for supporting the weight of a gas meter when secured thereto and to resist damage stemming from accidental contact by hard edged objects.

With particular reference to FIG. 2, the riser assembly 14 includes a metallic L-shaped riser pipe 62, plastic tubing 64 of a predetermined length and a shut-off valve 66. The riser pipe is formed from a selected length of metallic pipe bent medially at a 90° angle to define a vertical riser length 68 of about three feet in length having a top end 70 and a horizontal riser length 72 also of about three feet in length having a bottom end 74. The outer dimension of the tubing is smaller than the inside diameter of the riser pipe so that the tubing may be easily received therein. In assembly, the riser pipe 62 may be telescoped over the free end of the tubing to such an extent that the top end of such plastic pipe is received within the top end of the riser pipe.

Referring to FIG. 2, the top end 70 of the riser pipe 62 is formed with external screw threads 76 and joined interiorly with the top end of the plastic pipe by means of a compression joint in a manner well known in the art.

As shown in FIG. 2, the bottom extremity of the tubing 64 projects from the bottom end 74 of the riser pipe 62 to define an integral excess length 78 terminating at an excess end 79, the excess length being of sufficient length to, upon installation, reach the main gas line 102 (FIG. 7). Such excess length of tubing is determined in advance and may be on the order of fifty feet, but may be selected to be longer or shorter depending on specific applications. With continued reference to FIG. 2, an annular flexible sealing member 80 may be telescoped over the excess length of tubing and received within the bottom end of the riser pipe for sealing the riser pipe from earthen material when installed underground.

The joints may be in the form of a concentric sleeve and spigot nipple cooperating to form an annulus having a radial dimension less than the wall thickness of the plastic pipe 64 such that alignment of such nipple and sleeve serves to compress the wall of the entrapped plastic pipe to create a leak free compression joint.

In the configuration shown in FIG. 16, the riser 72' is depicted formed at its top end with a radially outwardly flared upset 250 having a reduced in diameter finishing sleeve formed interiorly thereof to cooperate with a concentric nipple of a spigot 252 having a threaded nipple 254 projecting therefrom for connection with the valve 66.

Referring to FIG. 9, the shut-off valve 66 is a conventional quarter-turn ball valve having a female threaded valve inlet fitting 82 at the bottom end thereof and a male threaded valve outlet fitting 84 at the top end thereof. The inlet fitting of the valve is threadedly engaged to the top end 70 (FIG. 2) of the riser pipe 62 to complete the riser assembly 14. As shown, in certain applications, the elbow 20 may be affixed to the bracket 22 in a planar orientation relative to the parallel legs 24 and 26 of the turned back U-fitting 16, rather that in the orthogonal orientation shown in FIGS. 1 and 2.

An elongated metallic tracer wire (not shown) may be incorporated with the riser assembly 14 and affixed along the excess length 78 of the plastic tubing 64 and to the top end 70 of the riser pipe 62. Such tracer wire allows for future service line identification and location by, for instance, a metal detector once the plastic tubing has been buried underground at the field installation site.

After the riser assembly 14 and the mounting assembly 12 have been factory fabricated as described above, the individual assemblies may be pressure leak tested at the factory site, as required by regulation at the factory. As such, the individual assemblies are pressurized to a predetermined minimum internal pressure, leak tested, and certified using methods known well to those skilled in the art. By pressure testing at the factory, field installation personnel are not burdened with the additional step of testing in the field and need not carry such testing equipment to the field. Therefore, as described below, field installation time is reduced substantially to minimize installation labor costs.

Figure 4:
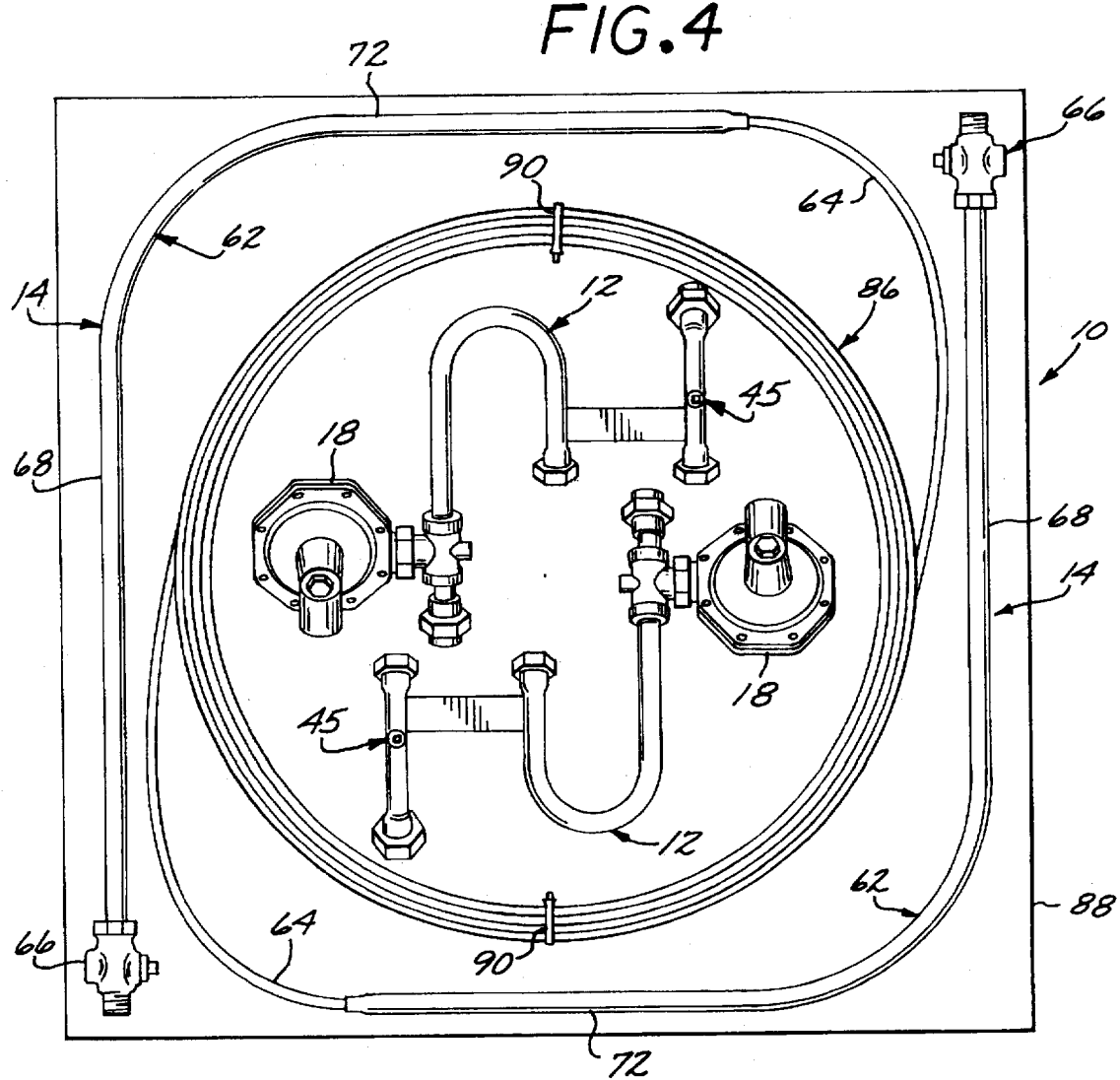
FIG. 4 is a front view of the gas service field completion kit shown packaged in accordance with the invention.

Referring now to FIG. 4, the riser assembly 12 and mounting assembly 14 may be packaged together in one configuration to form the kit 10. As shown, two riser assemblies 14 and two mounting assemblies 12 may be combined in the package, however more or less number of riser and mounting assemblies may be combined together into one package. The excess length of plastic tubing 64 may be gathered to form a compact coil 86. Thereafter, the riser assemblies and mounting assemblies are affixed to a mounting face of a generally square mounting board 88 of a desired width, height and thickness by tie wraps 90 or the like. The mounting board may be composed of "MASONITE" or cardboard or any other lightweight rigid stiff material. As shown, the two mounting assemblies are positioned generally at the central portion of the mounting board in juxtaposed relationship having the pressure regulators 18 thereof disposed outwardly from one another. The two riser pipes 62 are affixed at the outer periphery of the mounting board whereby the respective horizontal lengths thereof 72 and the respective vertical lengths 68 thereof are positioned at opposite sides of the mounting board and the respective shut-off valves 66 are at opposite corners thereof. The coils of plastic tubing are positioned in an encircling relationship to define a nest around the mounting assemblies. As such, the mounting and riser assemblies are packaged in an easy to store compact configuration. The mounting board, carrying the riser assemblies and mounting assemblies may be covered in a flexible plastic wrapping material and shrink wrapped to provide an easy to handle package. The packaged kit may now be labeled, incorporating a pressure test certification, and inventoried for future sale and distribution to customers.

It is to be appreciated that by providing a packaged gas service completion kit, the customer is alleviated from having to procure, store and inventory a multitude of individual components to be available every time a gas service line is to be installed. As such, costs associated with such activities are minimized.

Figure 12:
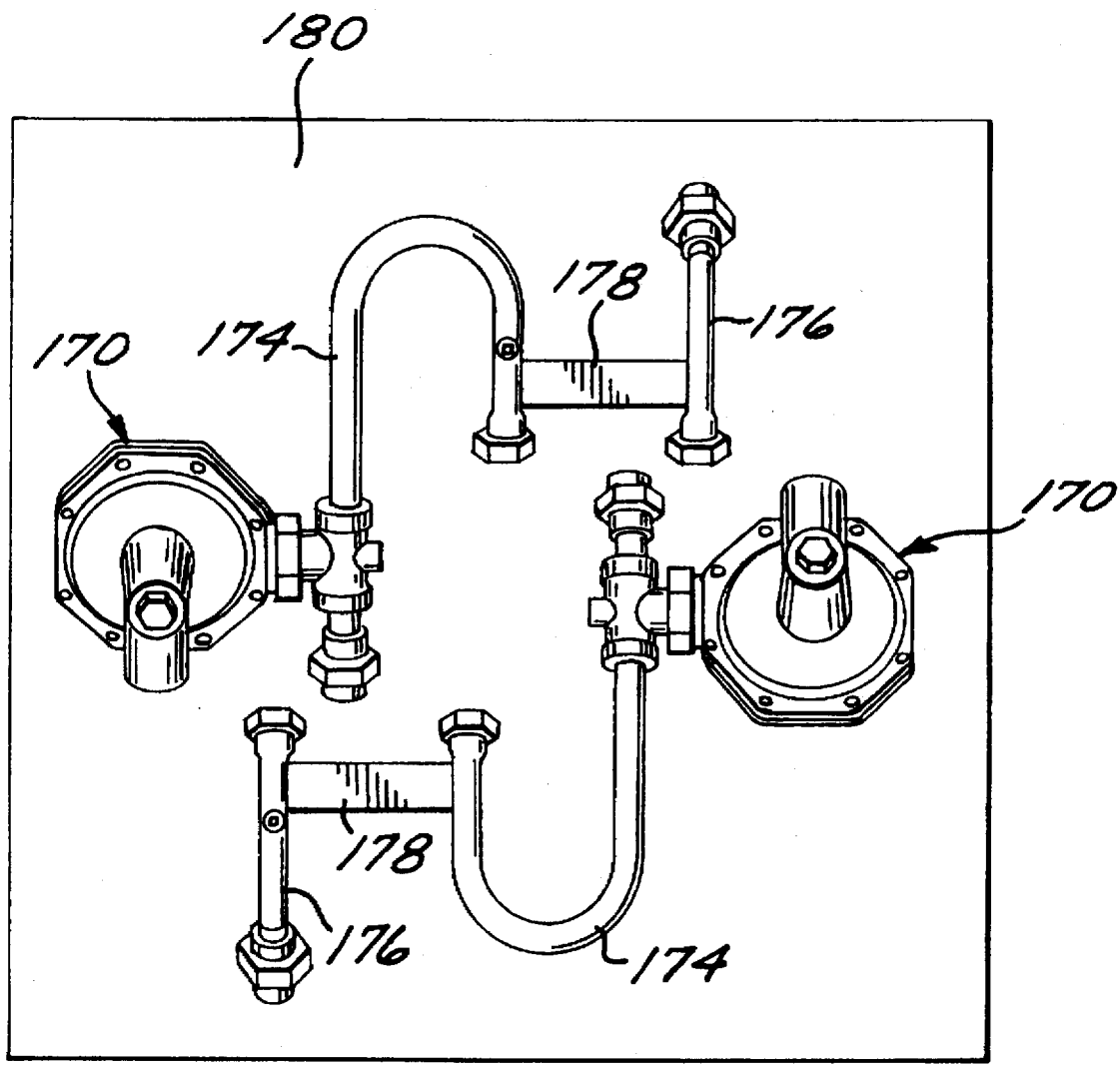
FIG. 12 is a front view of a gas service field completion kit packaged in accordance with an alternative aspect of the invention.

With reference to FIG. 12, the gas meter mounting assemblies, generally indicated at 170, may be fabricated as described above and packaged to form a gas meter mounting kit 172. It is to be anticipated that customers may prefer purchasing only such gas meter mounting assemblies for installation in the field. As similarly described above, each gas meter mounting assembly 170 includes a turned back U fitting 174 and an elbow fitting 176 joined together by a mounting bracket 176. The brackets 176 may be joined by welding or, as above, could be formed at their respective opposite extremities with semicircular clamps to releasably clamp on the respective pipes forming the respective fittings 174 and 176. As shown, two mounting assemblies 170 may be combined in the package, however more or less number of mounting assemblies may be combined in such package. The pressure tested mounting assemblies are affixed to a mounting face of a generally square rigid mounting board 180 composed, for instance, of "MASONITE", of a desired width, height and thickness by tie wraps (not shown), or the like. As shown, the two mounting assemblies 172 are positioned at the central portion of the mounting board in juxtaposed relationship having their respective pressure regulators 176 thereof disposed outwardly from one another. The pair of mounting assemblies may be covered in flexible wrapping material and shrink-wrapped to provide a compact, easy to store and handle package. The kit may be labeled and inventoried for future sale and distribution.

Figure 5:
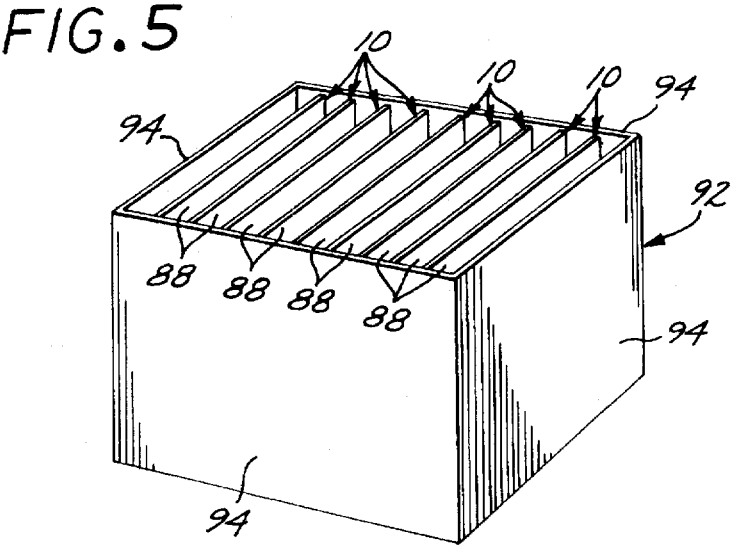
FIG. 5 is a reduced scale perspective view of container for receiving a plurality of gas service field completion kits of the type shown in FIG. 4.

As shown in FIG. 5, a plurality of packaged kits, assembled in the configuration shown in either FIG. 4 or FIG. 12, may be retrieved from inventory and assembled into a multiple bulk shipping crate or carton 92 having a bottom wall and four upstanding side walls 94 to form an open rectangular box or chamber. The mounting boards 88 of the kits are vertically aligned in juxtaposed relationship and secured within the crate. A lid may be disposed in covering relationship over the open end of the box and affixed thereover for bulk shipment to customers.

Figure 6:
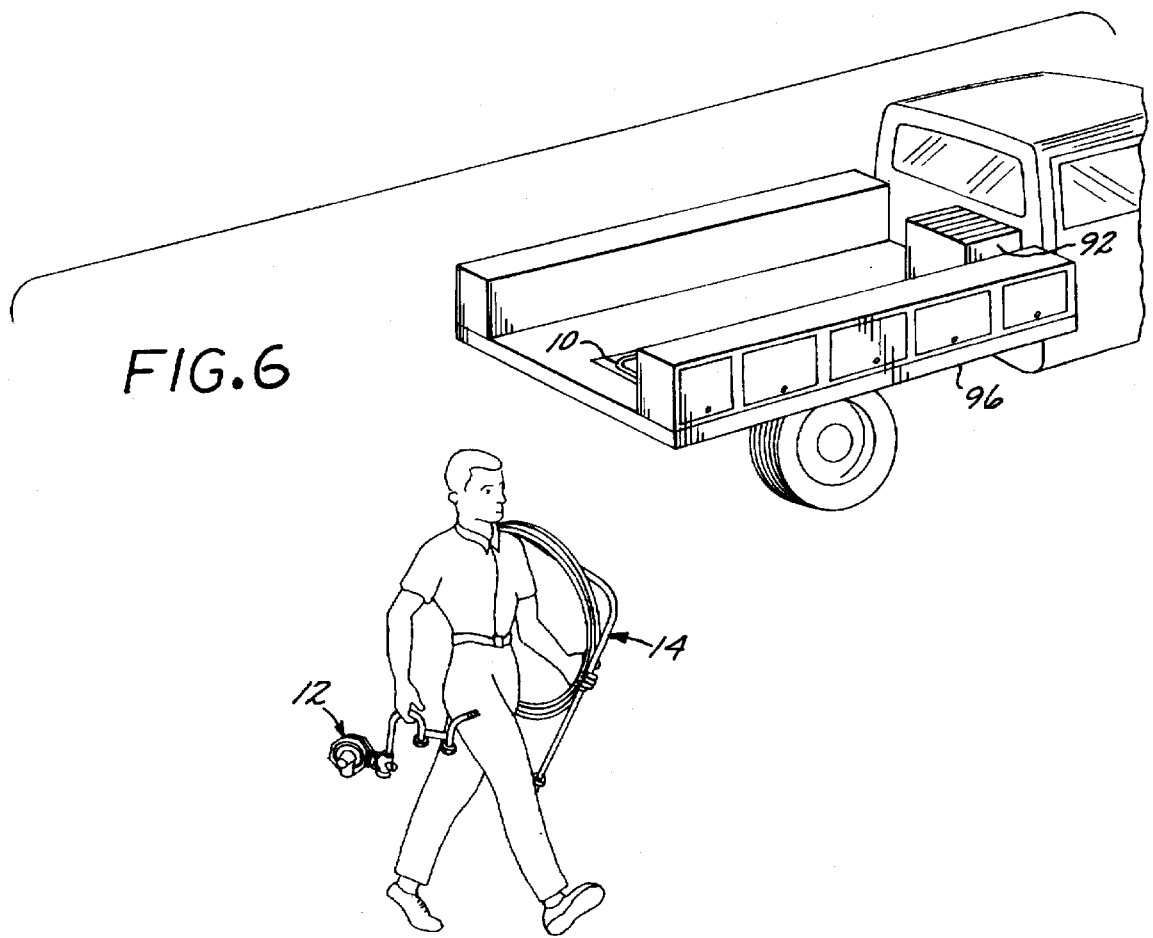
FIG. 6 is a perspective view, in reduced scale, of an installer carrying the components of the gas service field completion kit shown in FIGS. 1 and 2 to an installation site.

It is to be appreciated that the gas service completion kit 10 is configured for convenient rapid installation in the field by merely an individual installer, without assistance of a crew. Referring now to FIGS. 6, 7 and 8, installation of the gas service line to a residence utilizing the gas service completion kit of the invention can be described hereinafter in detail. It is to be appreciated that an installer may be scheduled to install a number of gas services to a number of newly constructed residences, for instance at a newly constructed housing tract. As such, he or she may load a crate 92 of kits onto the bed of a truck 96 and proceed to the housing tract. A trench 98 defining a service line connection path of a predetermined depth is typically excavated in advance leading from the gas service inlet pipe 100 at the residence to the gas main distribution pipe 102 usually located at the center of the street. The gas service inlet pipe is typically stubbed outwardly a few inches from one of the walls of the residence and approximately thirty inches above ground level. Furthermore, the gas distribution pipe will have already been tapped using a saddle-type tap 104 or the like including a swage-type fitting for connection to the plastic service line tubing 64. To install the service line, the installer may retrieve a kit 10 from the crate 92 and unpack one of the riser assemblies 14 and one of the mounting assemblies 12 therefrom. The installer may conveniently grasp the riser assembly and mounting assembly and carry them to the gas service inlet pipe 100 to the excavated site (FIG. 6).

Referring in particular to FIG. 7, the outlet union 46 of the elbow 20 of the mounting assembly 12 may be coupled to the inlet pipe 100 at the residence and tightened to orient the gas meter inlet and outlet union fittings 34 and 44 are generally parallel to the ground and the regulator 18 disposed in spaced relation from the wall of the residence so the short nipple 58 is vertically oriented relative to the ground. Thereafter, the top end 70 of the riser pipe 62 carrying the shut-off valve 66 thereon may be positioned under the bottom end union 60 of the nipple 56 of the mounting assembly, and the union coupled to the threaded outlet fitting 82 of the shut-off valve. Thereafter, the installer may direct the excess length of plastic tubing 64 along the bottom of the trench 98 and to the distribution main pipe 102. The excess end 79 of the tubing 64 may be trimmed to a convenient length and coupled to the swage-type fitting 104 located on the distribution main to complete the service line. It is to be appreciated that the complete service line installation procedure may be rapidly completed by one installer in a matter of two to five minutes, wherein the prior art method of installing such service could take on the order of an hour or more. The trench may thereafter be closed. As such, the mounting assembly 12 is in convenient accessible position for coupling the meter inlet 99 and meter outlet 101 fittings of the gas meter 102 (FIG. 9) to the first outlet end and second inlet end 40 of the mounting assembly to be installed by the gas company when actual gas service to the residence has been requested to thus orient the meter in an upright orientation for convenient reading of the meter dials.

Figure 13:
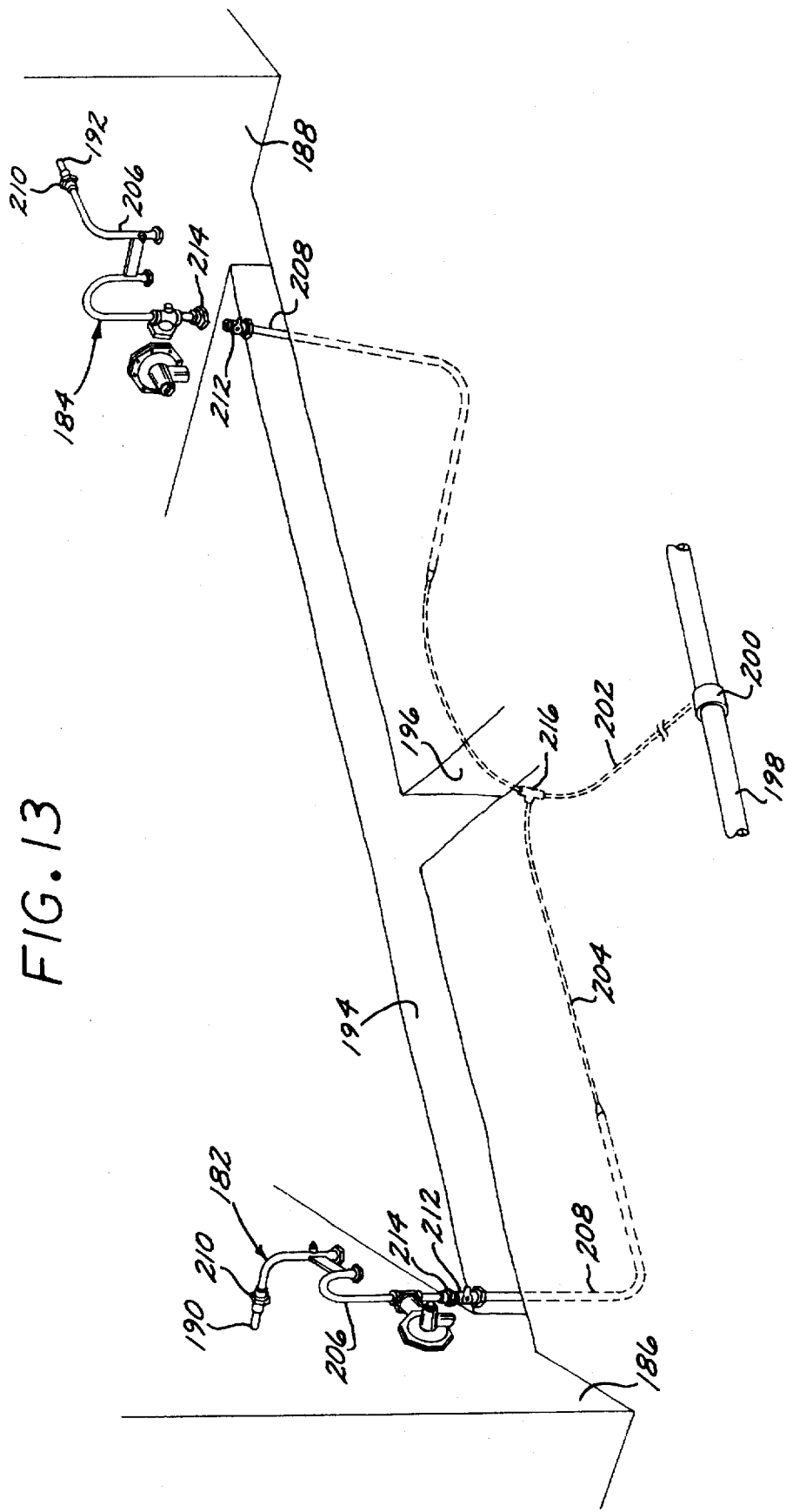
FIG. 13 is a perspective view, in reduced scale, of the gas service field completion kit of FIG. 1 during installation between two flanking residences.

Referring now to FIG. 13, installation of a pair of gas service field installation kits, generally indicated at 182 and 84, in the field will be described. As shown, a pair of adjacent dwelling homes 186 and 188 have respective gas service inlet pipes 190 and 192 stubbed outwardly a few inches from their respective opposing side walls, as is typically provided in housing developments. As shown, typically a cross trench 194 is excavated between the respective gas service inlet pipes merging with a central trench 196 to gas distribution main 198 at the center of the street including a saddle-type tap 200 having a swage-type fitting for connection to service line tubing. To install service lines from the adjacent dwelling homes to the gas distribution main, a packaged gas service completion kit 10 (FIG. 5) is retrieved from the crate 92 and the respective pair of gas service installation kits unpackaged from the mounting board 88. In the embodiment shown in FIG. 13, the gas service completion kit includes two installation kits wherein one of such kits 184 includes a long length of plastic service line tubing 202 and the other kit 182 includes a shorter length of plastic service line tubing 204. For instance, the long length of tubing 202 may be on the order of about one hundred and twenty feet and the short length of tubing 204 may be on the order of twenty feet; however, the respective lengths may be longer or shorter depending on the particular application. When the service connections are installed, the installer may grasp one set of riser assemblies 206 and one set mounting assemblies 208 and carry them to the respective gas service inlet pipes 190 and 192 at the respective homes 186 and 188. The respective outlet unions 210 of the respective mounting assemblies 206 may be coupled to the respective inlet pipes 190 and 192 and coupled thereto as described above. Thereafter, the respective top ends of the respective riser pipes 208 carrying respective shut-off valves 212 thereon are positioned under the bottom end of the respective mounting assemblies 206 and coupled to the respective outlet fittings 214 of such valves. The installer may direct the long length 202 of plastic tubing from the respective riser assembly 208 along the cross trench 194 and the central trench 196 to the gas distribution main 198. The excess end of such long length of tubing may be trimmed to an appropriate length and connected to the swage type tee fitting of the saddle tap 200 mounted on the main 198. Then, the installer may direct the short length 204 of tubing from the second riser assembly and direct it along the cross trench 194 to an intermediate location on the long length 202 of tubing. A tee fitting 216, enclosed with the kit, may be coupled to such intermediate location on the long length 202 of tubing for teeing to the second short length 204 of tubing. The excess end of the second short length of tubing 204 may be trimmed to an appropriate length and coupled to such tee fitting 216 to complete the gas service installation to the adjacent homes.

It is to be appreciated that service line installation to the pair of dwelling houses 186 and 188 may be easily and conveniently completed in a matter of five to eight minutes. Thereafter, the trench may be closed. As such, the utility company will have convenient access to the respective mounting assemblies 206 for coupling respective gas meters thereto when such utility is called to provide gas service to the respective homes.

Figure 11:
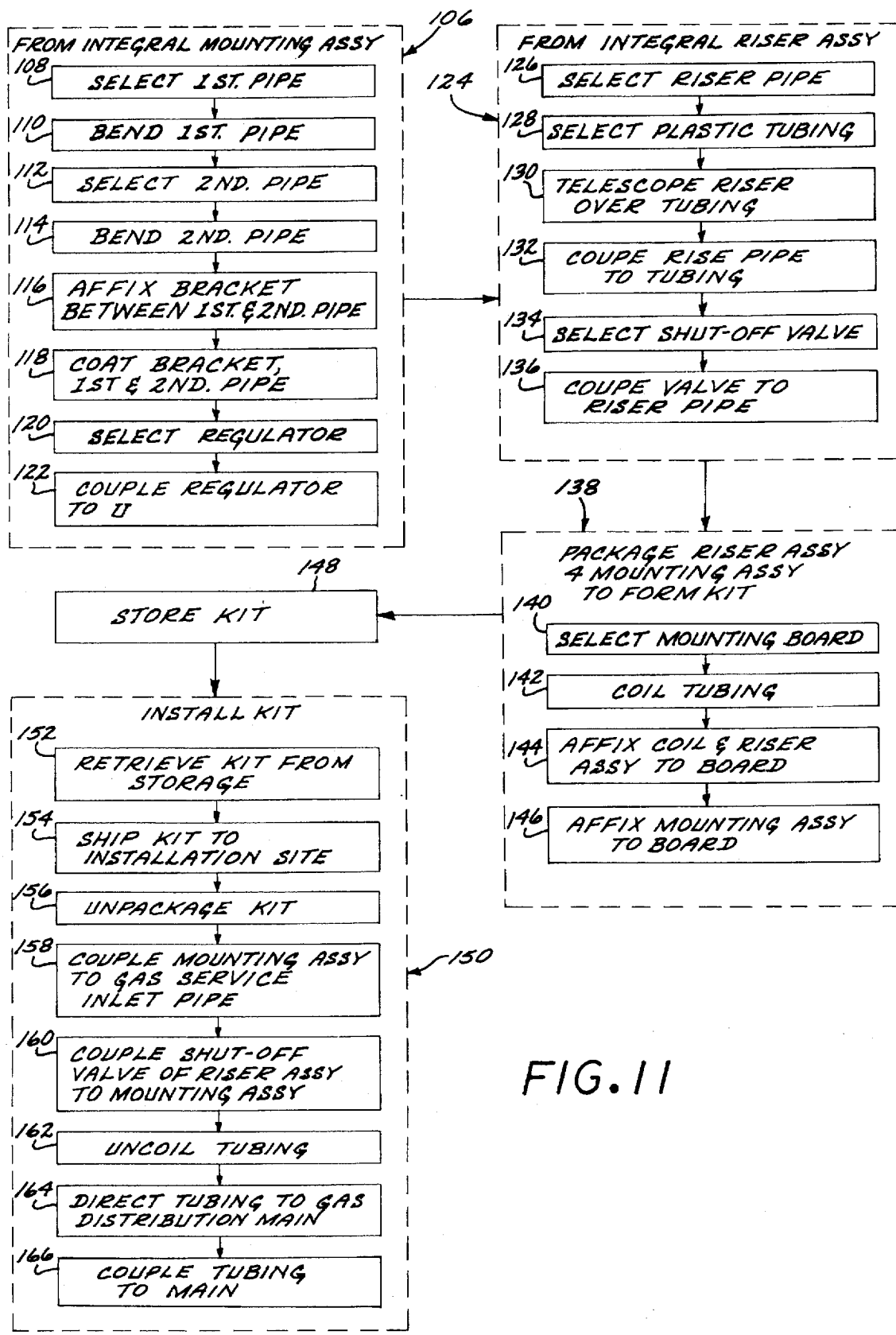
FIG. 11 is a flow diagram illustrating the method of fabricating the gas service field installation kit shown in FIG. 4.

With reference to FIG. 11, the method of fabricating the gas service line completion kit can be summarized briefly hereafter. The specifications for the development must first be determined typically from a customer's specification so that the distance from the street main 102 to the service line 100 is established. The riser assembly 14 and mounting assembly 12 may then be fabricated, however the order of assembly is not critical, and by way of example the method of forming the mounting assembly will be described first. To form the gas meter mounting assembly 106 a first metallic pipe is selected 108 and thereafter bent 110 in a predetermined radius to form a turned back U fitting having inlet and outlet ends. Then, a second metallic pipe is selected 12 and bent 114 with a predetermined radius to form an elbow having inlet and outlet ends. A bracket 22 may then be affixed 116 between the turned back U fitting and the bracket so that the inlet end of the elbow and the outlet end of the turned back U are spaced a predetermined distance apart and at a predetermined orientation. It will be appreciated that in some embodiments of the present invention, the bracket 22 may be in the form of a temporary plastic clip which may fractionally and releasably hold the fittings 16 and 20 during shipping and installation. Thereafter the bracket, turned back U fitting, and elbow are coated 118 with a protective coating. A pressure regulator is selected 120 having regulator inlet and outlet fittings and the outlet fitting thereof is then coupled 122 to the inlet end of the turned back U fitting.

To form the integral riser assembly 124 an L-shaped riser pipe of a selected length is selected 126 having the outer surfaces thereof coated with a protective polymeric coating, such as epoxy, the riser pipe being of the type formed with a vertical metallic riser length having an upper end and a horizontal metallic riser length having a bottom end. Then, a length of plastic tubing is selected 128 having a length greater than the overall length of the riser pipe and sufficient to extend between the tapping fitting and the gas inlet pipe fitting of the residence. The bottom end of the riser pipe is thereafter telescoped 130 over a free end of the plastic tubing so that an excess length of said plastic tubing projects from the bottom end. The free end of the plastic tubing is then coupled 132 to the upper end of the riser pipe to form a fluid tight joint therebetween. A shut-off valve is selected 134 of the type having valve inlet and outlet fittings and the inlet fitting thereof is coupled 136 to the upper end of the riser pipe.

With the riser and mounting assemblies formed the riser and mounting assemblies may be packaged together 138 to form the gas service completion kit. More particularly, to package the mounting assembly and riser assembly, a mounting board is selected 140 and the excess length of tubing is coiled 142 to form a coil. The coil and riser assembly along with the mounting assembly may then be affixed 144, 146 together to the mounting board as by ties 90 (FIG. 4). In addition, in the case of the embodiment shown in FIG. 13, a coupling tee 216 (FIG. 3) may be included and likewise affixed to the mounting board. The kit may thereafter be stored 148 for subsequent shipment to service installers.

With continued reference to FIG. 11, the method of installing the gas service kit 150 in the field can be briefly described hereafter. The kit may be retrieved from storage 152 and transported or shipped 154 to the field installation site. Thereafter, the kit may be unpackaged 156. The second outlet end of the mounting assembly is then coupled 158 to the gas service inlet pipe. The outlet fitting of the shut-off valve is coupled 160 to the regulator inlet end of the mounting assembly. The excess length of plastic tubing is then uncoiled 162 and the tubing directed 164 from the bottom end of the riser pipe to the gas distribution main. Finally, the excess end of the plastic tubing is coupled 166 to the tapping fitting 104 of the gas distribution main 102 to complete the service line installation. The mounting assembly is now in a position to operatively mount a gas meter supplied by the utility when actual gas service is desired.

In the embodiment illustrated in FIG. 13, the second mounting assembly 206 and riser assembly 208 are installed similarly as described heretofore. However, the coupling tee 216 would then be coupled to an intermediate location along the long length of tubing 202 and the excess end of the short length of tubing 204 from the second riser assembly coupled thereto to complete gas service installation to adjacent homes.

From the foregoing, it can be appreciated that the present invention provides an economical method of fabricating a pre-packaged gas service field completion kit for convenient rapid field installation of a service connection through a gas meter between a gas distribution main and a residential or commercial gas inlet pipe. The kit incorporates a minimum number of components to facilitate ease of assembly which, in turn, lowers manufacturing costs while providing a straight forward construction to enhance reliability.

While particular forms of the invention have been illustrated and described, it will be apparent that various modifications can be made without departing from the spirit and scope of the invention.

What is claimed is:

1. A method of mass producing gas service field installation kits at a factory for providing service line connections through respective gas meters having respective meter inlets and outlets arranged in respective predetermined orientations between a gas distribution main line and respective gas service inlet pipe fittings, each spaced a predetermined distance away from said distribution main, the method comprising the steps of:

determining said predetermined orientation and said predetermined distance;

forming an integral gas meter mounting assembly by selecting first and second metallic pipes of respective predetermined lengths, bending said first and second pipes to form in said first pipe a turn-back U fitting having first inlet and outlet ends, and in said second pipe an elbow having second inlet and outlet ends, selecting a bracket and affixing said turn-back U fitting and said elbow thereto to orient said outlet end of said turn-back U fitting and said inlet end of said elbow in a complementary orientation relative to said predetermined orientation for connection to the respective said meter inlets and outlets, selecting a pressure regulator having regulator inlet and outlet fittings, and coupling said outlet fitting of said pressure regulator to said first inlet end of said turn-back U fitting;

forming an integral riser assembly by selecting a metallic L-shaped riser pipe of a selected length to define a vertical riser length having an upper end and a horizontal riser length having a bottom end, selecting plastic tubing of a length greater than said selected length, telescoping said bottom end of said riser pipe over a free end of said plastic tubing so that an excess length of said plastic tubing projects from said bottom end to terminate in an excess end, coupling said free end of said plastic tubing to said upper end of said riser pipe to form a gas impermeable seal, selecting a shut-off valve of the type having valve inlet and outlet fittings, and coupling said inlet fitting of said valve to said upper end of said riser pipe;

coiling said excess length of said plastic tubing pipe in a coil;

packaging said riser assembly and said gas meter mounting assembly together to form said kit; and storing said kit for subsequent installation.

2. The method according to claim 1 that includes:

after affixing said bracket to said turn-back U-fitting and said elbow, coating the outer surfaces of said bracket, said turn-back U fitting, and said elbow are coated with a protective polymeric coating.

3. The method according to claim 1 that includes:

coating the outer surface of said riser pipe of said riser assembly with a protective polymeric coating.

4. The method according to claim 1 that includes:

orienting said horizontal leg of said elbow and said turn-back U-fitting in orthogonal planes relative to one another.

5. The method according to claim 1 wherein the step of affixing said bracket to said elbow and said turn-back U-fitting includes welding.

6. The method according to claim 1 that includes:

mounting respective threaded couplings on said first outlet end of said turn-back U-fitting and said second inlet end of said elbow to threadedly engage the respective said gas meter inlets and outlets, and mounting a threaded coupling on said second outlet end of said elbow to threadedly engage said gas service inlet pipe fitting.

7. The method of fabricating a gas service kit according to claim 1 wherein said step of packaging said riser assembly and said mounting assembly to form said kit includes the steps of:

selecting a mounting board having a predetermined width and height;

affixing said coil of plastic tubing and said riser pipe assembly to said board;

affixing said mounting assembly including said regulator to said board.

8. A method of installing a gas service field installation kit, fabricated in accordance with claim 7, at a field installation site having an excavated distribution trench extending between said gas distribution main line and said gas service inlet pipe fitting, comprising the further steps of:

transporting said kit to said field installation site;

unpackaging said kit by removing said plastic tubing, riser pipe and said mounting assembly from said board;

coupling said second outlet end of said mounting assembly to said gas service inlet pipe;

coupling said shut-off valve outlet fitting of riser assembly to said regulator inlet fitting of said mounting assembly;

uncoiling said excess length of plastic tubing;

directing said excess length of plastic tubing along said trench from said riser pipe to said gas distribution main;

trimming said excess end of said plastic tubing to length and coupling it to said gas distribution main line.

9. A method of mass producing gas service field installation kits for subsequent installation to provide service line connections through respective gas meters having respective meter inlets and outlets arranged in predetermined spacings and in predetermined orientations to connect a gas distribution main line with respective gas service inlet pipe fittings, each spaced a maximum of a predetermined distance away from said distribution main, the method comprising the following steps:

determining said predetermined orientation and said predetermined spacing;

forming a gas meter mounting assembly by selecting first and second metallic pipes, bending said first and second pipes to form in said first pipe a turn-back U fitting having first inlet and outlet ends, and in said second pipe an elbow having second inlet and outlet ends, selecting a bracket and affixing said turn-back U fitting and said elbow thereto to orient said outlet end of said turn-back U fitting and said inlet end of said elbow in a complementary spacing and orientation relative to said predetermined spacing and said predetermined orientation for connection to the respective said meter inlets and outlets, coating the outer surfaces of said bracket, said turn-back U fitting, and said elbow with a protective polymeric coating, selecting a pressure regulator having regulator inlet and outlet fittings, and coupling said outlet fitting of said pressure regulator to said first inlet end of said turn-back U fitting;

forming a riser assembly by selecting a metallic L-shaped riser pipe of a selected length to define a vertical riser length having an upper end and a horizontal riser length having a bottom end, selecting integral plastic tubing of a length greater than said selected length of riser pipe, telescoping said bottom end of said riser pipe over an end of said plastic tubing sufficiently far to leave an excess length of said plastic tubing projecting from said bottom end to terminate in an excess end, coupling said free end of said plastic tubing to said upper end of said riser pipe to form a gas impermeable seal, selecting a shut-off valve of the type having valve inlet and outlet fittings, and coupling said inlet fitting of said valve to said upper end of said riser pipe;

coiling said excess length of said plastic tubing into a coil;

packaging said riser assembly and said gas meter mounting assembly together to form said kit; and storing said kit for subsequent installation.

10. The method according to claim 9 that includes:

in the step of forming said mounting assembly, orienting said horizontal leg of said elbow and said turn-back U-fitting in orthogonal planes relative to one another.

11. The method according to claim 9 wherein:

the step of affixing said bracket to said elbow and said turn-back U-fitting includes welding.

12. The method according to claim 9 that includes:

in said step of forming said mounting assembly, mounting respective threaded couplings on said first outlet end of said turn-back U-fitting and said second inlet end of said elbow to threadedly engage the respective said gas meter inlets and outlets, and mounting a threaded coupling on said second outlet end of said elbow to threadedly engage said gas service inlet pipe fitting.

13. The method of fabricating a gas service kit according to claim 9 wherein:

said step of packaging said riser assembly and said mounting assembly to form said kit includes the steps of selecting a mounting board having a predetermined width and height;

affixing said coil of plastic tubing and said riser pipe assembly to said board;

affixing said mounting assembly including said regulator to said board.

14. The method according to claim 13 that includes:

selecting said mounting board of the type that is square and packaging two of said kits together on said board to orient the respective said vertical and horizontal lengths of the respective said riser pipes extending along adjacent orthogonal sides of said mounting board.

15. The method of fabricating a gas service kit according to claim 1 wherein:

said step of packaging said riser assembly and said mounting assembly to form said kit includes the steps of selecting a mounting board having a predetermined configuration to provide a face having a selected periphery;

coiling said excess length of said plastic tubing of said riser pipe assembly to form said coil in a size smaller than that of said selected periphery;

placing said coil and riser pipe on said face with the periphery of said coil within the confines of said selected periphery;

affixing said coil and said riser pipe assembly to said board;

placing said mounting assembly on said board; and affixing said mounting assembly to said board.

16. The method of fabricating a gas service kit according to claim 15 wherein:

said coiling step includes coiling said excess length to configure said coil with a central opening defining a nest and wherein;

said step of placing said mounting assembly on said board includes placing said mounting assembly in said nest.

17. A method of mass producing a set of gas service field installation kits at a factory for providing service line connections through respective gas meters having respective meter inlets and outlets arranged in a predetermined orientation between a gas distribution main line and the respective gas service inlet pipe fittings, each spaced a predetermined distance away from said distribution main, the method comprising the steps of fabricating each kit by:

determining said predetermined distance;

determining said predetermined orientation;

forming a gas meter mounting assembly by selecting first and second metallic pipes of the respective predetermined lengths, bending said first and second pipes to form in said first pipe a turn-back U fitting having first inlet and outlet ends, and in said second pipe an elbow having second inlet and outlet ends, said first outlet end and said second inlet end configured for connection to the respective said meter inlets and outlets, selecting a pressure regulator having regulator inlet and outlet fittings, and coupling said outlet fitting of said pressure regulator to said first inlet end of said turn-back U fitting;

forming an integral riser assembly by selecting a metallic L-shaped riser pipe of a selected length to define a vertical riser length having an upper end and a horizontal riser length having a bottom end, selecting plastic tubing of a length greater than said predetermined distance, telescoping said bottom end of said riser pipe over a free end of said plastic tubing so that an excess length of said plastic tubing projects from said bottom end to terminate in an excess end, coupling said free end of said plastic tubing to said upper end of said riser pipe to form a gas impermeable seal, selecting a shut-off valve of the type having valve inlet and outlet fittings, and coupling said inlet fitting of said valve to said upper end of said riser pipe;

coiling said excess length of said plastic tubing into a coil;

packaging said riser assembly and said gas meter mounting assembly together to form said kit; and storing said kits for subsequent installation.

18. A method of mass producing gas service field installation kits for subsequent installation to provide service line connections through respective gas meters having respective meter inlets and outlets arranged in a predetermined orientation to connect a gas distribution main line with respective gas service inlet pipe fittings, each spaced a predetermined distance away from said distribution main, the method comprising the steps of fabricating each kit by:

forming a gas meter mounting assembly by selecting first and second metallic pipes of the respective predetermined lengths, bending said first and second pipes to form in said first pipe a turn-back U fitting having first inlet and outlet ends, and in said second pipe an elbow having second inlet and outlet ends, said outlet end of said turn-back U fitting and said inlet end of said elbow configured for connection to the respective said meter inlets and outlets, coating the outer surfaces of said turn-back U fitting and said elbow with a protective polymeric coating, selecting a pressure regulator having regulator inlet and outlet fittings, and coupling said outlet fitting of said pressure regulator to said first inlet end of said turn-back U fitting;

forming an integral riser assembly by selecting a metallic L-shaped riser pipe of a selected length to define a vertical riser length having an upper end and a horizontal riser length having a bottom end, selecting plastic tubing of a length greater than said selected length, telescoping said bottom end of said riser pipe over a free end of said plastic tubing so that an excess length of said plastic tubing projects from said bottom end to terminate in an excess end, coupling said free end of said plastic tubing to said upper end of said riser pipe to form a gas impermeable seal, selecting a shut-off valve of the type having valve inlet and outlet fittings, and coupling said inlet fitting of said valve to said upper end of said riser pipe;

coiling said excess length of plastic tubing into a coil;

packaging said riser assembly and said two-piece gas meter mounting assembly together to form said kit; and storing said kit for subsequent installation.

19. A method of forming on a factory assembly line a predetermined number of gas service field installation kits for providing service line connections along respective selected paths of respective predetermined distances from a gas main to a predetermined number of gas meters having respective meter inlets and outlets, the method comprising the steps of:

forming a predetermined number of integral meter mounting assemblies by selecting respective first and second metallic pipes of respective predetermined lengths, bending the respective said first and second pipes to form in the respective said first pipes respective turn-back U fittings having respective first inlet and outlet ends, and in said second pipe an elbow having second inlet and outlet ends to form in the respective said second pipes respective elbows having respective second inlet and outlet ends, selecting respective pressure regulators having respective regulator inlet and outlet fittings, and coupling the respective said outlet fittings of said pressure regulators to the respective said first inlet ends of the respective said turn-back U fittings;

forming a predetermined number of integral riser assemblies by selecting respective metallic riser pipes, selecting respective plastic tubes of a length of at least the respective said predetermined distances, telescoping one end of the respective said riser pipes over a free end of the respective said plastic tubes so that an excess length of the respective said plastic tubes project from the respective one ends of the respective said riser pipes to terminate in respective excess ends, coupling the respective said free ends of said plastic tubes to the respective opposite ends of said riser pipes to form respective gas impermeable seals therebetween, selecting respective shut-off valves of the type having respective valve inlet and outlet fittings, and coupling the respective said inlet fittings of the respective said valves to the respective said opposite ends of the respective said riser pipes;

coiling said excess length of said plastic tube into respective coils;

selecting a predetermined number of stiff mounting boards of a predetermined configuration;

packaging the respective said riser assemblies and said gas meter mounting assemblies together on the respective said mounting boards to form said predetermined number of kits; and storing said kits for subsequent installation.

20. The method of mass producing a predetermined number of gas service installation kits according to claim 19 that includes the following step:

selecting a carton configured with an open chamber for receipt of said predetermined number of said kits; and inserting said kits in said chamber.

21. The method according to claim 7 wherein:

said step of selecting said mounting board includes selecting a mounting board being quadrilateral in shape; and said step of packaging said kit includes packaging a pair of respective mounting assemblies and riser assemblies together including the steps of:

coiling the respective said excess lengths of plastic tubing of said pair of riser assemblies together to form said coil;

affixing said pair of riser assemblies to said board with the respective said vertical and horizontal lengths of the respective said riser pipes extending along adjacent sides of said mounting board;

affixing said coil to said mounting board such that the coil lies within the confines of said selected periphery with the central opening of the coil defining a nest; and affixing said pair of mounting assemblies and their respective regulators to said board within said nest.

22. A method of mass producing gas service field installation kits at a factory for providing service line connections through respective gas meters having respective meter inlets and outlets arranged in respective predetermined orientations between a gas distribution main line and respective gas service inlet pipe fittings, each spaced a predetermined distance away from said distribution main, the method comprising the steps of:

determining said predetermined orientation and said predetermined distance;

forming a gas meter mounting assembly by selecting first and second metallic pipes, said first pipe comprising a turn-back U fitting having first inlet and outlet ends, and said second pipe comprising an elbow having second inlet and outlet ends, selecting a bracket and affixing said turn-back U fitting and said elbow thereto to orient said outlet end of said turn-back U fitting and said inlet end of said elbow in a complementary orientation relative to said predetermined orientation for connection to the respective said meter inlets and outlets, selecting a pressure regulator having regulator inlet and outlet fittings, and coupling said outlet fitting of said pressure regulator to said first inlet end of said turn-back U fitting;

forming an integral riser assembly by selecting a metallic L-shaped riser pipe of a selected length to define a vertical riser length having an upper end and a horizontal riser length having a bottom end, selecting plastic tubing of a length greater than said selected length, telescoping said bottom end of said riser pipe over a free end of said plastic tubing so that an excess length of said plastic tubing projects from said bottom end to terminate in an excess end, coupling said free end of said plastic tubing to said upper end of said riser pipe to form a gas impermeable seal, selecting a shut-off valve of the type having valve inlet and outlet fittings, and coupling said inlet fitting of said valve to said upper end of said riser pipe;

packaging said riser assembly and said gas meter mounting assembly together to form said kit; and storing said kit for subsequent installation.

23. A set of factory fabricated gas service installation kits to provide a service line connection through a set of gas meters having respective meter inlets and meter outlets arranged in a predetermined spacings and orientations to connect between a gas distribution main line and respective gas service inlet pipe fittings spaced a predetermined distance away from said gas distribution main, each kit of said set comprising:

a gas meter mounting assembly including first and second metallic pipes of respective predetermined lengths, said first pipe formed with a turn-back U fitting having first inlet and outlet ends, said second pipe formed with an elbow having second inlet and outlet ends, a bracket affixing said turn-back U fitting and said elbow together to orient said first outlet end of said turn-back U fitting and said second inlet end of said elbow spaced apart at said predetermined spacing and configured for connection to the respective said meter inlet and outlet, and a pressure regulator having regulator inlet and outlet fittings, said regulator outlet fitting coupled to said first inlet end of said ram-back U fitting; and a riser assembly including a metallic L-shaped riser pipe of a selected length to define a vertical riser length having an upper end and a horizontal riser length having a bottom end, an integral plastic tubing of a length greater than said selected length having one end telescoped into said bottom end of said riser sufficiently far to leave an excess length of said plastic tubing projecting from said bottom end to terminate in an excess end, said one end of said tubing being coupled to said upper end of said riser pipe to form a gas impermeable seal therebetween, and a shut-off valve of the type having valve inlet and outlet fittings, said valve inlet fitting coupled to said upper end of said riser pipe.

* * * * *